May 4, 1954 J. E. NEWTON 2,677,208
FISHING FLOAT
Filed Oct. 6, 1947
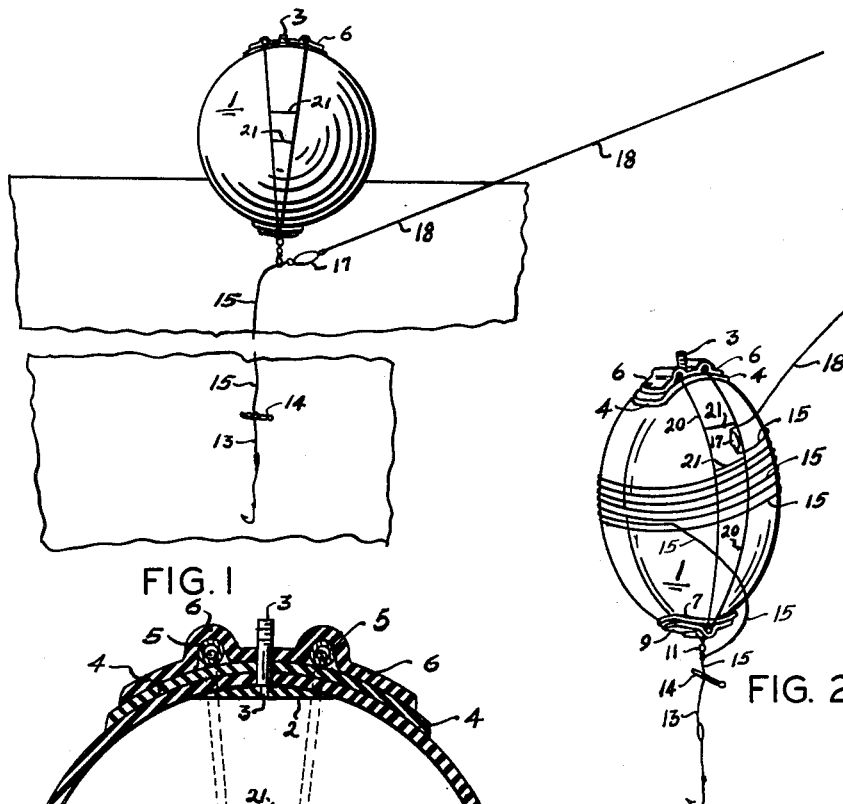
FIG. 1
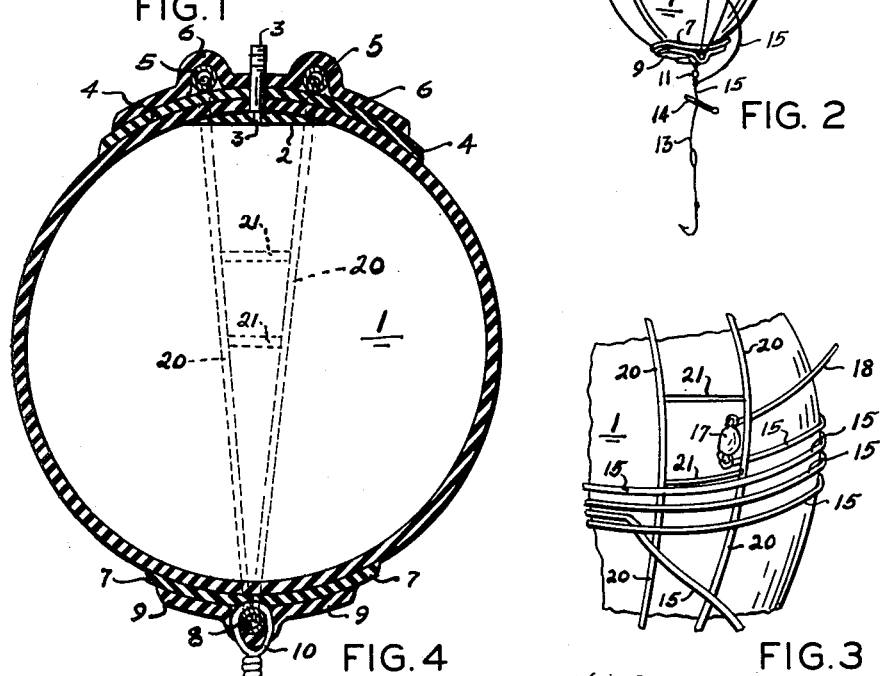
FIG. 2
FIG. 4  FIG. 3
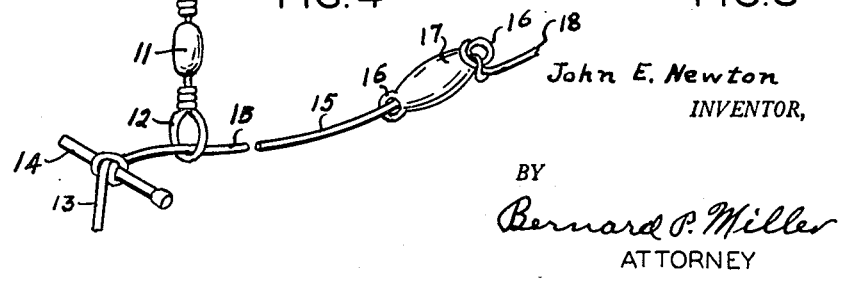
John E. Newton
INVENTOR,
BY
Bernard P. Miller
ATTORNEY Patented May 4, 1954

2,677,208

UNITED STATES PATENT OFFICE 2,677,208

FISHING FLOAT

John E. Newton, Oklahoma City, Okla.; now by judicial change of name John Fishmaster Application October 6, 1947, Serial No. 778,137

5 Claims. (Cl. 43—43.11)

My invention relates to fishing floats which are normally used in line fishing, for supporting that portion of the line which carries the weight, hooks, bait, etc., in suspension below the surface of the water.

In line fishing, either in bank pole fishing or casting, it is common practice to provide a comparatively small float, cork, or "bobber," adjacent, yet spaced from the free end of the line. Such floats not only act to support the line-weight off the bottom, but also act as a visible means by which the fisherman may recognize the fact that a fish is biting, or has bitten the bait. Most conventional fishing floats are made of light wood, cork, or the like, and are not of a sufficient size, or do not have sufficient buoyancy to offer much resistance to submergence by the fish. Due to their relatively small size, the person fishing with such conventional floats, must keep the float close enough to him for observation, and the possible distance from the bank is consequently limited.

It is the principal object of the present invention, to provide a fishing float of sufficient size to be seen for relatively long distances, yet which is sufficiently light in weight to permit comparatively great distances to be covered by the float, which could not be obtained by conventional floats when casting by hand.

This is accomplished, by providing a float consisting of an air inflated, resilient, envelope or bag.

Another object is to provide a float of this class which has sufficient inherent buoyancy to offer considerable resistance to submergence by a biting fish, such resistance being great enough to "set" the fish-hook in the mouth of the fish.

It is obvious, that should a fishing float be made of wood or cork, in sufficient size to be seen at great distances, it would be so heavy that no great casting distance could be obtained. It is also obvious, that since a wood or cork float rides the water with approximately one-half of its body submerged, in order to be observed at a given distance, it would have to be made substantially twice as large as an air inflated float, which rides with approximately ninety per cent of its body above the surface of the water.

A further object of the present invention, is to provide a float which rides high in the water, and which therefore may be floated out from the bank by the action of a breeze or by the waves or current.

An additional object is to provide a large fishing float which is light in weight, and which when deflated, is not bulky to pack in a tackle box.

A still further object, is to provide a float for the purposes set forth, which may be manufactured at a cost which will not make the consumer price prohibitive.

Other objects will be apparent from the following description when taken in conjunction with the accompanying single sheet of drawings, wherein:

Figure 1 is an elevational view of the device operatively supporting the hook bearing end of a conventional fishing line;

Figure 2 is a perspective view illustrating a possible mode of installing the line;

Figure 3 is an enlarged fragmentary view detailing a portion of Fig. 2; and

Figure 4 is a vertical sectional view taken transversely through the device as depicted in Fig. 1.

Like characters of reference designate like parts in those figures of the drawings in which they occur.

In the drawings:

The reference numeral 1 indicates, as a whole, a hollow substantially spherical body, envelope or bag which is constructed of sheet rubber, and which is air-tight. The body 1, when inflated only to the extent that it is filled but not stretched, assumes the form of a modified ellipsoid. In other words, it is shaped somewhat like an army canteen, having two identical and oppositely disposed side faces which are each concavo-convex, and having an annular edge surface which spacedly connects the edges or rims of the side faces. When more fully inflated, without any restriction having been placed therearound, the body 1 becomes somewhat more spherical in form. The top of the body 1 has an inner disc 2 carrying a tubular valve housing 3 which extends through and projects upwardly from the top wall of the body.

Surrounding the valve housing 3, and vulcanized or otherwise attached flatly to the exterior surface of the body 1, there is provided a disc 4 which is hermetically sealed around the valve housing 3.

Lying flatly along the exterior surface of the disc 4, is a pair of short parallel tubes or tubate ears 5 which are preferably made of plastic. A disc-like sheet 6 of sheet rubber surrounds the housing 3, envelops the two tubes 5, and is vulcanized to the upper surface of the disc 4.

The upper slightly arcuate surface areas 4 and 6, the lower slightly arcuate surface areas 7 and 9, form surface sections or areas which are slightly arcuate, adjacent the surface area of the envelope 1.

The bottom of the body 1 has a disc-like sheet 7 of sheet rubber vulcanized to its outer surface, and a short tube or tubate ear 8 is held flatly against the sheet 7 by an outer disc 9, also of sheet rubber.

As best illustrated in Fig. 4, the upper eye 10 of a conventional fishing line swivel 11 surrounds the tube 8, and is anchored to the body 1 by its engagement with the tube. The swivel 11 has a lower eye or loop 12.

The body 1 may be inflated by the introduction of air through the valve housing 3, a suitable cut-off valve, not shown, being provided in the housing for retaining the air in the body.

Extending around the body 1, and passing through one of the upper tubes 5 and both passing through the lower tube 8, are two endless belt lines 20. The lines 20 are attached together adjacent the vertical center of the body 1 by horizontal tie lines 21. The offices of the belt lines 20 and the two tie lines 21 are more fully described hereinbelow.

One practical manner of mounting the device on a conventional fishing line, is best illustrated in Figure 4.

The reference numeral 13 indicates the extreme outer or hook bearing portion of a conventional fishing line, and this line portion 13 is looped about, and firmly tied to a transverse pin or stop 14.

The reference numeral 15 indicates that portion of the fishing line which extends next beyond the stop 14. This portion 15 is the part of the line which passes freely through the lower eye 12 of the swivel 11. The portion 15 is passed through both eyes 16 of a suitable bead or stop member 17, and looped about and tied to one of the eyes 16 so that the stop cannot move along the line.

The reference numeral 18 indicates that portion of the fishing line which extends from the stop 17 to the fisherman's rod, not shown.

With the body 1 inflated, and thus installed on the fishing line, the device is prepared for launching into the water, in the following manner.

The line is drawn upwardly through the eye 12 of the swivel 11 until the stop 14 contacts the eye.

The upper stop 17 is tied to the line at a desired distance from the lower stop 14. This distance is governed by the depth, below the body 1, at which it is desired to ultimately position the fishhook while fishing.

After the stop 17 has been suitably anchored on the line, the line portion 15 is passed upwardly, and is repeatedly wound transversely about the central portion of the body 1 (Figs. 2 and 3), until the upper stop 17 is brought into contact with the body 1. The stop 17 is then passed under one of the belt lines 20 just below one of the tie lines 21.

The belt line 20 under which the stop is passed, impinges the line portions 15 and 18 against the surface of the body 1 with sufficient frictional engagement to hold the stop 17 in place under normal conditions. However, the stop may be drawn from beneath the belt line 20 by a quick jerk upon the line portion 18.

The tie line 21 acts to prevent the stop 17 from traveling upwardly along the belt line 20, should such a jerk be exerted. The tie line therefore insures removal of the stop 17 beneath the belt line when a quick jerk is exerted.

In fishing with the device prepared in the above described manner, as best illustrated in Fig. 2, a usual cast of the device is made from a bank position lying either "up-wind" or "up-stream" from the location at which it is desired to ultimately fish in a lake or stream. This fishing location may well be two or three hundred yards from the bank position from which the cast is made. The line portion 18 is played out from a reel until the body drifts to the desired fishing location.

When the body 1 has drifted to the desired fishing spot, the unwinding of the reel is stopped. A quick jerk is then made on the line by suitable manipulation of the fishing pole. The jerk withdraws the upper stop 17 from beneath the belt line 20 as hereinabove described, and the weight of the bait, sinker, etc. carried by the line portion 13 causes the line portion 15 to slip downwardly through the lower eye 12 of the swivel 11, said portion 15 being unwound from around the body 1, as the bait sinks in the water. The upper stop 17 eventually reaches the eye 12 and stops downward movement of the bait.

Should a fish now strike the bait on the fishhook, the buoyancy of the body 1 offers sufficient resistance to the pull of the fish to "set" the fishhook in its mouth.

It is pointed out that even though the body 1 may be located so remotely from the fisherman that he cannot observe each and every one of its movements, he can observe whether or not the body has been submerged by looking for light reflection from its surface. If the body surface is dry, no light will be reflected. If light is reflected, then the fisherman knows that he has had a bite of sufficient power to submerge the float for at least an instant. It is therefore preferred that the float be made of black rubber for the better reflecting of the surface while wet.

When a fish has been caught, and the line is being reeled in, the body 1 offers sufficient resistance to its movement through the water to cause the eye 12 to move back along the line portion 15 until it comes in contact with the lower stop 14. This movement gradually raises the hooked fish in the water until it is traveling through the water at only a slight distance beneath its surface. Consequently, the fish is brought to the bank suspended in the water, instead of traveling along the lake or stream bed. The result is that the fish cannot entangle the line in jagged rocks or snags adjacent such bed.

When not in use, the body 1 may be deflated and rolled or folded into a small compact package which will easily fit within a usual fishing tackle box.

The float is made of sufficient size to offer enough resistance to set the hook in a fish's mouth.

Obviously the invention is susceptible to some change or alteration without defeating its practicability, and I therefore do not wish to be confined to the preferred embodiment shown in the drawings and described herein, further than I am limited by the scope of the appended claims.

I claim:

1. In a float for a fishing line, a comparatively large hollow resilient envelope adapted to be inflated with air, said envelope when inflated having sufficient inherent buoyancy to prevent its being continuously submerged by a fish; a check-valve for retaining air in said envelope; two parallel spaced tubate ears attached rigidly to the exterior of the top wall of said envelope in a slightly arcuate relation thereto; a single similar ear, similarly arcuate, attached similarly to the exterior of the bottom wall of said envelope; a pair of belt lines contiguously surrounding the envelope vertically, said lines individually passing through a respective top ear, and both passing through the bottom ear; a swivel fitting having an upper eye pivotally carried by said bottom ear; a fishing line slidable through the lower eye of said fitting; and spaced stops on the fishing line to limit its sliding movement through the last mentioned eye.

2. Structure as specified in claim 1, and means for limiting separating movement of said belt lines, intermediate the upper and lower ears.

3. In a float for a fishing line, a comparatively large hollow resilient envelope adapted to be inflated with air, said envelope when inflated having sufficient inherent buoyancy to prevent its being continuously submerged by a fish; a check-valve for retaining air in the envelope; two parallel spaced tubate ears attached rigidly to the exterior of the top wall of said envelope in a slightly arcuate relation thereto; a reinforcing tube of rigid material anchored in each ear; a single similar ear attached to the exterior of the bottom wall of said envelope; a reinforcing tube of rigid material anchored in the last mentioned ear; a pair of belt lines contiguously and slidably surrounding the envelope vertically, said lines individually passing through a respective one of the upper reinforcing tubes, and said lines passing through the bottom reinforcing tube; a swivel fitting having an upper eye pivotally carried by said lower ear; a fishing line slidable through the lower eye of said fitting; and spaced stops on the fishing line for limiting its sliding movement through the last mentioned eye.

4. Structure as specified in claim 3, and means for limiting separating movement of said belt lines, intermediate the upper and lower ears.

5. In a fishing float: a hollow air inflated envelope of flexible material, having an air retaining valve and sufficient inherent buoyancy when inflated for preventing its being continuously submerged by a fish; a swivel attached to the bottom surface of said envelope, having an eye at each end thereof; a fishing line slidable through the lower eye thereof, said swivel being the sole means for connecting the fishing line to the said envelope after the said envelope has been set in fishing condition; spaced stops on the fishing line for limiting the sliding movement thereof through said lower swivel eye; and an endless belt line contiguously and slidably surrounding the envelope vertically, said belt line slidably attached to the said envelope, only at the top and bottom and through the upper eye of said swivel, for temporarily holding a portion of said fishing line while it is wrapped around the periphery of the said envelope pending its release by a quick jerk on the line.

References Cited in the file of this patent

UNITED STATES PATENTS

| Number | Name | Date |
|---|---|---|
| 427,730 | Bond | May 13, 1890 |
| 849,367 | Burke | Apr. 9, 1907 |
| 1,193,684 | Gregory | Aug. 8, 1916 |
| 1,253,583 | Filiewicz | Jan. 15, 1918 |
| 1,469,885 | Britzwein | Oct. 9, 1923 |
| 1,633,484 | Guidotti | June 21, 1927 |
| 1,850,748 | Foster | Mar. 22, 1932 |
| 1,950,933 | Snell | Mar. 13, 1934 |

FOREIGN PATENTS

| Number | Country | Date |
|---|---|---|
| 17,233 | Great Britain | 1903 |
| 248,419 | Great Britain | Mar. 3, 1926 |
| 474,993 | Great Britain | Nov. 11, 1937 |
| 855,584 | France | Feb. 19, 1940 |